United States Patent
Johnson et al.

[11] Patent Number: 5,645,328
[45] Date of Patent: Jul. 8, 1997

[54] EARLY ACTIVATION RECOVERY CONTROL METHOD AND SYSTEM FOR VEHICLE ANTI-LOCK BRAKE SYSTEM

[75] Inventors: Bernard W. Johnson, Brighton; Mark Luckevich, Ann Arbor, both of Mich.

[73] Assignee: Kelsey-Hayes Company, Romulus, Mich.

[21] Appl. No.: 514,836

[22] Filed: Aug. 14, 1995

Related U.S. Application Data

[63] Continuation of Ser. No. 303,767, Sep. 9, 1994, abandoned.

[51] Int. Cl.$^6$ .................................................. B60T 8/94
[52] U.S. Cl. .................. 303/158; 303/122.06; 303/156; 303/165; 303/176; 188/181 C
[58] Field of Search ........................... 303/122, 122.06, 303/122.07, 122.08, 121, 154, 156, 157, 158, 159, 160, 164, 165, 163, 170, 174, 175, 177, 178, 184, 176; 364/426.01, 426.02; 188/181 C, 181 A

[56] References Cited

U.S. PATENT DOCUMENTS

| | | | |
|---|---|---|---|
| 4,651,281 | 3/1987 | Masaki et al. | 303/110 X |
| 4,739,484 | 4/1988 | Fennel | 364/426.02 |
| 4,883,325 | 11/1989 | Shimanuki et al. | 303/96 |
| 4,917,444 | 4/1990 | Ishido et al. | 303/100 |
| 4,921,312 | 5/1990 | Harris | 303/103 X |
| 5,190,361 | 3/1993 | Onaka et al. | 303/103 X |
| 5,257,857 | 11/1993 | Okazaki | 303/110 X |
| 5,273,350 | 12/1993 | Yagi et al. | 303/109 |
| 5,431,488 | 7/1995 | DeVore . | |

*Primary Examiner*—Douglas C. Butler
*Attorney, Agent, or Firm*—Brooks & Kushman P.C.

[57] ABSTRACT

A control method and system for a vehicle anti-lock brake system to provide for recovery from premature activation of the vehicle anti-lock brake system. The control system includes a microprocessor and accompanying components to perform the control method steps of generating an input signal representing a vehicle wheel velocity, processing the input signal to determine a wheel slip duration, comparing the wheel slip duration to a slip duration threshold, generating a premature activation recovery control signal when the wheel slip duration fails to exceed the slip duration threshold, and performing premature activation recovery control of the anti-lock brake system in response to the premature activation recovery control signal.

26 Claims, 3 Drawing Sheets

EARLY ACTIVATION RECOVERY CONTROL METHOD AND SYSTEM FOR VEHICLE ANTI-LOCK BRAKE SYSTEM

This is a continuation of application Ser. No. 08/303,767 filed on Sep. 9, 1994, now abandoned.

TECHNICAL FIELD

This invention relates generally to vehicle anti-lock brake systems. More particularly, this invention relates to an early activation recovery control method and system for vehicle anti-lock brake systems.

BACKGROUND ART

In an effort to protect vehicle operators and occupants, vehicle manufacturers and their suppliers are increasingly designing and manufacturing vehicles with additional and improved safety features. One such safety feature that has been incorporated into a number of vehicle types is anti-lock braking, which can take a variety of forms.

Vehicle anti-lock brake systems are designed to maximize the ability of a vehicle operator to bring a vehicle to a controlled stop on any type of road surface. The system accomplishes this goal by preventing the vehicle brakes from prematurely halting vehicle wheel rotation, or "locking" the vehicle wheels, regardless of the road surface and the pressure applied to the brake pedal by the vehicle operator.

Typical vehicle anti-lock brake systems comprise a vehicle wheel speed sensor for providing input to an anti-lock brake system control unit. The control unit controls an anti-lock brake system control valve interposed between the brake master cylinder and the individual wheel brakes of an hydraulic brake circuit. The control valve, in turn, regulates hydraulic brake fluid pressure in the individual wheel brakes to implement anti-lock braking.

In operation, the vehicle wheel speed sensor not only measures the vehicle wheel speed, but also provides input to the control unit for determining a vehicle speed. The control unit monitors the vehicle and vehicle wheel speeds for an indication of an anti-lock braking event. First, based upon the vehicle speed, the control unit typically determines a slip threshold. Using the vehicle velocity as a reference, slip threshold may be expressed as the difference between a selected velocity and the vehicle velocity.

Next, the control unit compares the vehicle wheel velocity to the vehicle velocity to determine a departure depth. Again using the vehicle velocity as a reference, departure depth may be expressed as the difference between the vehicle velocity and the wheel velocity. During normal vehicle braking, the wheel velocity closely matches the vehicle velocity. Thus, during normal vehicle braking, the difference between the vehicle velocity and the wheel velocity is nominal.

However, during an anti-lock braking event, the wheel velocity decreases significantly below, or "departs" from, the vehicle reference velocity. In such a situation, as for example during hard braking on an ice covered road, the brake torque exceeds that which is provided by the tire to road interfaces. Uncontrolled, such a torque differential causes the vehicle wheel to cease rotating, or to "lock." In turn, wheel lock reduces traction and the ability of the vehicle operator to bring the vehicle to a controlled stop.

To prevent such vehicle wheel lock and the accompanying problems, the control unit of an anti-lock brake system activates the anti-lock brake system control valve to regulate hydraulic brake fluid pressure in the individual wheel brakes during an anti-lock braking event. More specifically, the control unit compares the departure depth to the slip threshold and actuates the control valve when the departure depth exceeds the slip threshold in order to isolate the individual vehicle wheel brakes in the hydraulic brake circuit from the master cylinder, thereby halting any increase in brake fluid pressure in the vehicle wheel brakes.

More particularly, when, during vehicle braking, the departure depth exceeds the slip threshold, the control valve isolates brake fluid in the individual wheel brake from the brake fluid pressure in the master cylinder in order to hold brake fluid pressure in the wheel brake constant. If the isolated brake fluid pressure in the wheel brake is still high enough to cause incipient wheel lock, the anti-lock brake system then bleeds, or dumps, brake fluid from the wheel brake to reduce brake fluid pressure therein.

Thereafter, the anti-lock brake system typically holds brake fluid pressure in the wheel brake constant until such time as the departure depth no longer exceeds the slip threshold, indicating that the vehicle wheel is again travelling at or near the velocity of the vehicle. At that time, the anti-lock brake system then increases, or builds, brake fluid pressure in the wheel brake by reapplying brake fluid thereto. Reapplication of brake fluid to the wheel brake may be at a steep or gradual rate, or some combination thereof, depending upon the circumstances or the control desired.

One problem associated with anti-lock brake systems as described above is the possibility of false, or premature, activation. Premature activation can occur in a number of circumstances, such as where a road surface is partially ice covered or bumpy and individual vehicle wheels experience different coefficients of friction during braking. Typical anti-lock brake systems activate when the departure depth of any one of the vehicle wheels exceeds the slip threshold, despite the fact that the wheel would not have experienced excessive slip.

Moreover, typical anti-lock brake systems decrease the slip threshold after activation in order to increase anti-lock brake system sensitivity during an anti-lock braking event. Under normal conditions, this action improves the ability of the vehicle operator to slow or stop the vehicle in a controlled fashion. However, in the event of premature activation of the anti-lock brake system, such action merely compounds the problem of premature activation.

Previous attempts to solve the premature activation problem included controlling the anti-lock brake system based on the assumption that if the control valve isolated the wheel brake from the master cylinder and the anti-lock brake system did not undertake a reduction of brake fluid pressure in the wheel brake, then the anti-lock brake system had activated prematurely. However, such a technique has proven unsatisfactory in that it is possible to meet the pressure reduction criterion while still encountering premature activation of the anti-lock brake system.

DISCLOSURE OF INVENTION

According to the present invention, a control method and system are provided for a vehicle anti-lock brake system, the control method and system providing for recovery from premature activation of the vehicle anti-lock brake system. The control method comprises the steps of generating an input signal representing a vehicle wheel velocity, processing the input signal to determine a vehicle deceleration, and comparing the vehicle deceleration to a deceleration threshold. The control method of the present invention further comprises the steps of generating a premature activation recovery control signal when the vehicle deceleration fails to exceed the deceleration threshold and performing premature activation recovery control of the anti-lock brake system in response to the premature activation recovery control signal.

Alternatively, the control method of the present invention providing for recovery from premature activation of the vehicle anti-lock brake system comprises the steps of generating an input signal representing a vehicle wheel velocity, processing the input signal to determine a wheel slip duration, and comparing the wheel slip duration to a slip duration threshold. The control method further comprises generating a premature activation recovery control signal when the wheel slip duration fails to exceed the slip duration threshold, and performing premature activation recovery control of the anti-lock brake system in response to the premature activation recovery control signal.

The control system providing for recovery from premature activation of the vehicle anti-lock brake system comprises means for generating an input signal representing a vehicle wheel velocity, means for processing the input signal to determine a vehicle deceleration, and means for comparing the vehicle deceleration to a deceleration threshold. The control system further comprises means for generating a premature activation recovery control signal when the vehicle deceleration fails to exceed the deceleration threshold and means for performing premature activation recovery control of the anti-lock brake system in response to the premature activation recovery control signal.

Alternatively, the control system providing for recovery from premature activation of the vehicle anti-lock brake system comprises means for generating an input signal representing a vehicle wheel velocity, means for processing the input signal to determine a wheel slip duration, and means for comparing the wheel slip duration to a slip duration threshold. The control system further comprises means for generating a premature activation recovery control signal when the wheel slip duration fails to exceed the slip duration threshold and means for performing premature activation recovery control of the anti-lock brake system in response to the premature activation recovery control signal.

Accordingly, it is the principle object of the present invention to provide an improved control method and system for a vehicle anti-lock brake system.

Another object of the present invention is to provide an improved control method and system for a vehicle anti-lock brake system that provides for recovery from premature activation of the anti-lock brake system.

These and other objects and advantages will be readily apparent upon consideration of the following description and drawings.

BEST MODE FOR CARRYING OUT THE INVENTION

Figure 1:
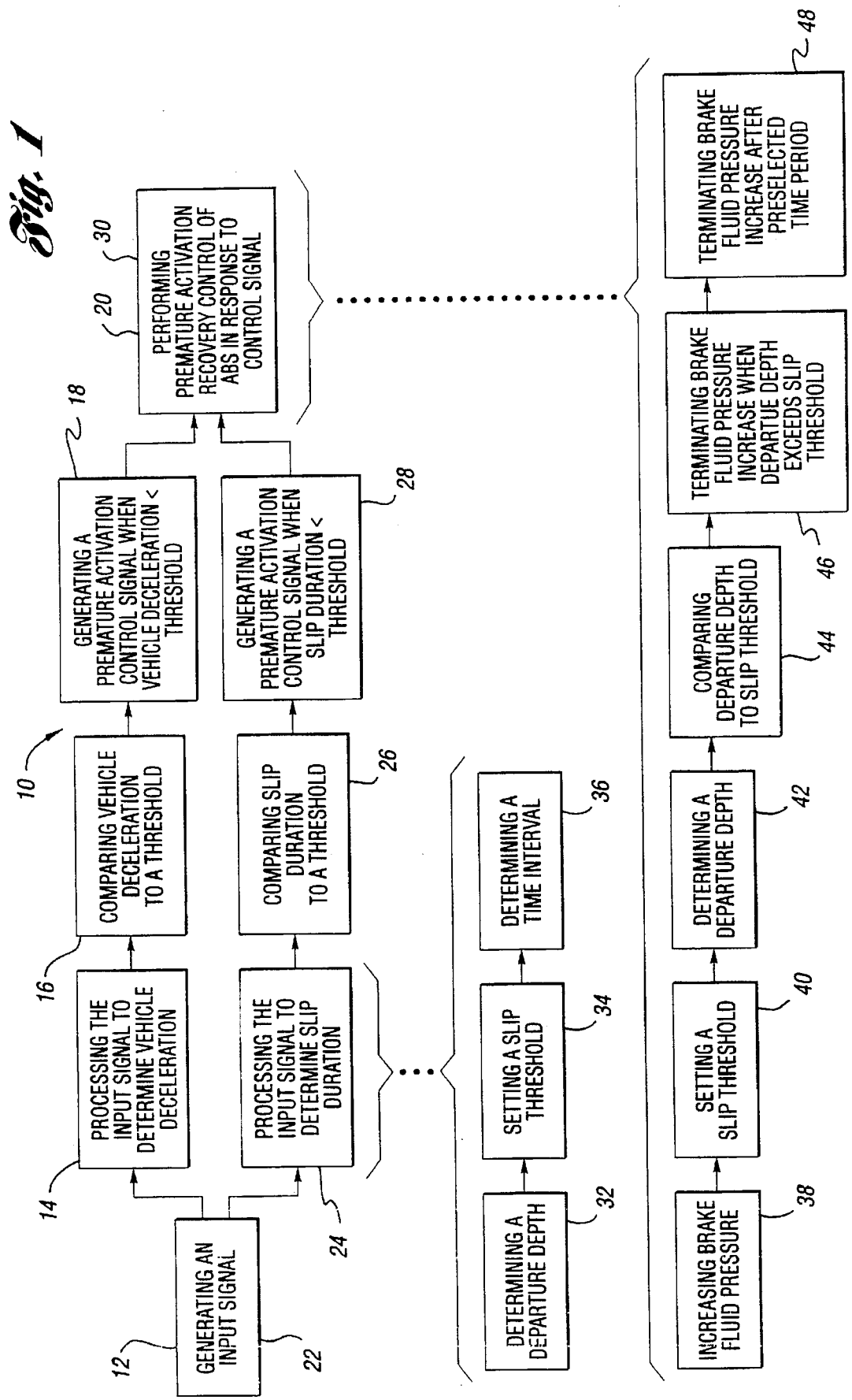
FIG. 1 is a block diagram of the control method of the present invention.

Referring now to FIG. 1, the control method of the present invention is show in block diagram form, denoted generally by reference numeral 10. According to the general aspects of the present invention, the control method 10 assumes that the anti-lock brake system has activated prematurely until determining otherwise. Until such time, a premature activation recovery control of the anti-lock brake system is engaged. Once the control method 10 determines that the anti-lock brake system has not activated prematurely, a normal control of the anti-lock brake system is engaged.

As used herein, premature activation control of the anti-lock brake system is defined in terms of normal control of the anti-lock brake system. Normal control is defined as activation of the anti-lock brake system when either of the departure depths associated with each of the two front vehicle wheels exceeds a slip threshold having a normal operation level. The normal operation level of the slip threshold is defined as that slip threshold providing for the most effective operation of the anti-lock brake system, based on experience.

In a similar fashion, premature activation recovery control of the vehicle anti-lock brake system is defined as a control of the vehicle anti-lock brake system when both of the departure depths associated with each of the two front vehicle wheels fail to exceed a slip threshold having a premature activation level, and both departure depths begin to decrease. As previously described, a slip threshold may be expressed as the difference between the vehicle reference velocity and a selected velocity. Thus, the premature activation level of the slip threshold is defined as a slip threshold level greater than the normal operation level of the slip threshold.

More specifically, after the vehicle anti-lock brake system has activated in response to either or both of the departure depths associated with the front two vehicle wheels exceeding the normal activation level of the slip threshold, the control method 10 of the present invention assumes such activation to be premature until such time as either departure depth also exceeds the premature activation level of the slip threshold. At such a time, activation of the anti-lock brake system is determined not to have been premature and normal control of the anti-lock brake system continues.

However, if both departure depths fail to exceed the premature activation level of the slip threshold and begin to decrease, indicating the need for building pressure in the front wheel brake through reapplication of brake fluid thereto, activation of the anti-lock brake system is determined to have been premature. In that event, the control method 10 of the present invention engages premature activation recovery control of the anti-lock brake system, thereby bypassing normal control.

Alternatively, even if the departure depths do not indicate premature activation of the anti-lock brake system, the control method of the present invention may also examine vehicle deceleration and/or wheel slip duration before determining if the anti-lock brake system has activated prematurely. More particularly, if the vehicle deceleration fails to exceed a selected deceleration threshold, the control method of the present invention then examines wheel slip duration. If the wheel slip duration also fails to exceed a selected slip duration threshold, then the control method of the present invention determines that the prior activation of the anti-lock brake system was premature and premature activation recovery control thereof is engaged. However, if either of the vehicle deceleration or wheel slip duration parameters exceed their respective thresholds, the control method of the present invention determines that the prior activation of the anti-lock brake system was not premature and normal control thereof continues.

During premature activation recovery control of the anti-lock brake system, both of the two front wheel brakes experience an aggressive brake fluid pressure buildup intended to quickly raise brake fluid pressure therein to a level appropriate for the existing road surface. Such a pressure buildup is terminated when a significant departure depth is experienced associated with either of the two front wheels, or after a preselected time period elapses.

Thus, the goal of surface friction utilization of the control method of the present invention is assumed to be satisfied inductively by requiring a certain slip depth, vehicle deceleration and/or slip duration parameters. As described generally above, the control method 10 of the present invention provides for recovery from premature activation of a vehicle anti-lock brake system. More specifically, as seen in FIG. 1, the control method 10 comprises the steps of generating 12 an input signal representing a vehicle wheel velocity, processing 14 the input signal to determine a vehicle deceleration, and comparing 16 the vehicle deceleration to a deceleration threshold. The method 10 further comprises generating 18 a premature activation recovery control signal when the vehicle deceleration fails to exceed the deceleration threshold and performing 20 premature activation recovery control of the anti-lock brake system in response to the premature activation recovery control signal.

Alternatively, the control method 10 of the present invention providing for recovery from premature activation of the vehicle anti-lock brake system may also comprise generating 22 an input signal representing a vehicle wheel velocity, processing 24 the input signal to determine a wheel slip duration, and comparing 26 the wheel slip duration to a slip duration threshold. This alternative embodiment of the method 10 also comprises generating 28 a premature activation recovery control signal when the wheel slip duration fails to exceed the slip duration threshold and performing 30 premature activation recovery control of the anti-lock brake system in response to the premature activation recovery control signal.

In this embodiment, processing 24 the input signal to determine a wheel slip duration may itself comprise determining 32 a departure depth and setting 34 a slip threshold at a normal activation level. Processing 24 the input signal to determine a wheel slip duration may also comprise determining 34 a time interval between when the departure depth exceeds the slip threshold and when the departure depth fails to exceed the slip threshold.

In either embodiment, performing 20, 30 premature activation recovery control may itself comprise increasing 36 brake fluid pressure to a vehicle wheel brake prematurely isolated from a master cylinder brake fluid pressure at a premature activation recovery rate, setting 38 a slip threshold at a premature activation recovery level, and determining 40 a departure depth. Performing 20, 30 premature activation recovery control may further comprise comparing 42 the departure depth to the premature activation recovery level of the slip threshold, and 44 terminating the premature activation recovery rate of brake fluid pressure increase to the vehicle wheel brake when the departure depth exceeds the premature activation recovery level of the slip threshold. Performing 20, 30 premature activation recovery control may still further comprise terminating 46 the premature activation recovery rate of brake fluid pressure increase to the vehicle wheel brake after a preselected period of time.

As previously described, a slip threshold may be expressed as the difference between the vehicle velocity and a selected velocity. Thus, setting a slip threshold at a premature activation level is accomplished by determining the vehicle velocity and calculating the premature activation level of the slip threshold based thereon. More specifically, as is well known in the art, the vehicle velocity can be determined based upon the history of wheel velocity information provided by wheel speed sensors, which are described more particularly below in conjunction with the control system of the present invention. A premature activation slip threshold level can then be determined by calculating the difference between the vehicle velocity and a selected velocity less than the vehicle velocity.

As also described previously, a departure depth may be expressed as the difference between the vehicle velocity and the wheel velocity. Thus, determining a departure depth may be accomplished by determining the vehicle velocity, measuring a vehicle wheel velocity, and calculating the difference therebetween. In determining a departure depth, a wheel speed sensor, described in greater detail below in conjunction with the control system of the present invention, provides wheel speed information history which can also be used to determine the vehicle velocity.

Figure 2:
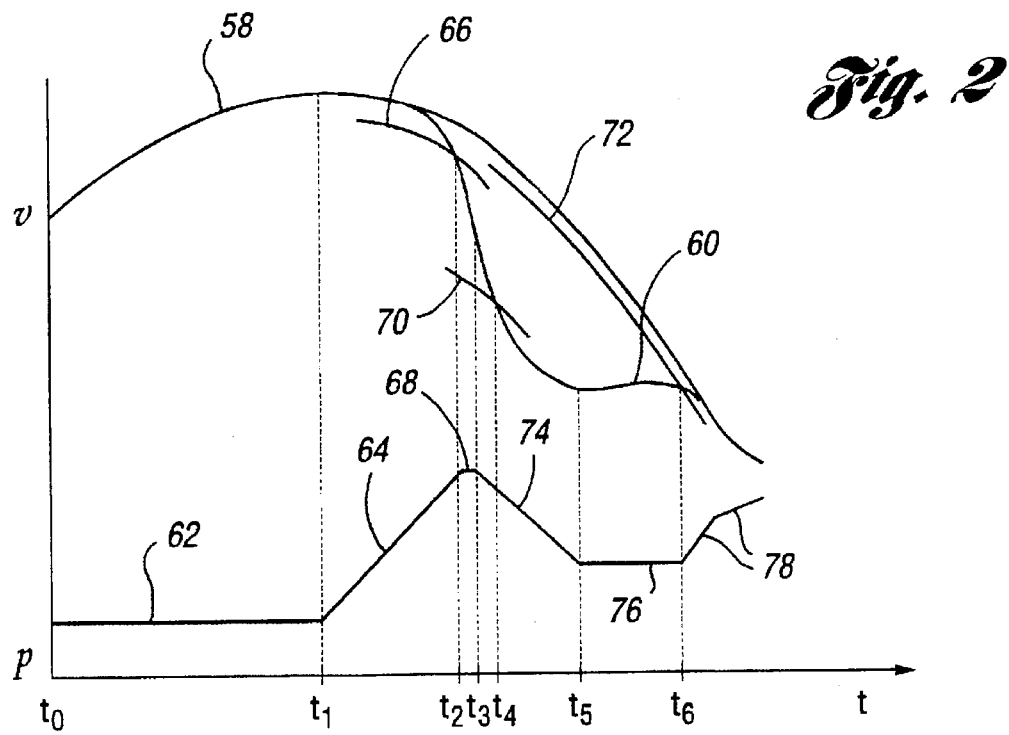
FIG. 2 is graph of a vehicle and a wheel velocity, as well as brake fluid pressure levels over time during an ordinary anti-lock braking event.
Figure 3:
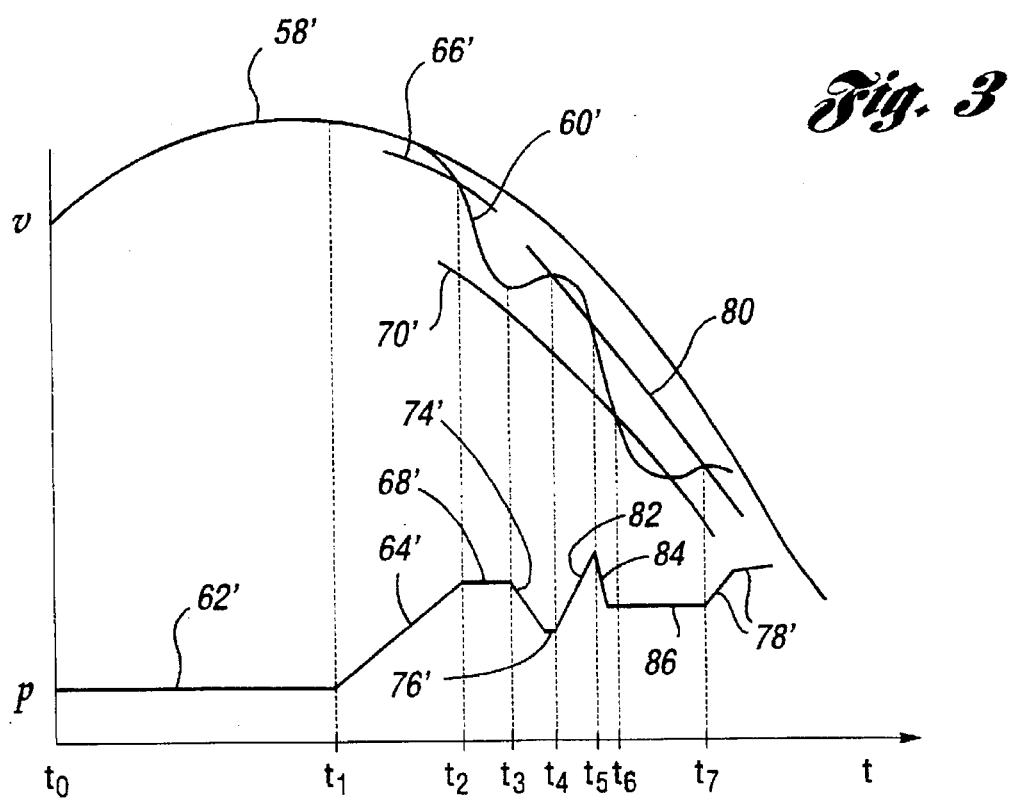
FIG. 3 is a graph of a vehicle and a wheel velocity, as well as brake fluid pressure levels over time during premature activation of the anti-lock brake system.

Referring now to FIGS. 2 and 3, graphs of a vehicle and a wheel velocity, as well as brake fluid pressure levels in a brake associated with the wheel, are shown during an ordinary anti-lock braking event and during premature activation of the anti-lock brake system, respectively. More specifically, FIGS. 2 and 3, respectively, depict normal and premature activation recovery control of an anti-lock brake system.

As seen in FIG. 2, while both vehicle velocity 58 and wheel velocity 60 increase between time $t_0$ and $t_1$, wheel brake pressure remains static 62. At time $t_1$, the vehicle operator begins braking the vehicle. Both vehicle and wheel velocities 58, 60 begin to decrease in response to increasing brake pressure as the wheel brake is applied 64.

At time $t_2$, wheel velocity 60 has begun to decrease more rapidly than vehicle velocity 58, creating a departure depth. The departure depth having exceeded the normal operation level of the slip threshold 66, the anti-lock brake system is activated to isolate the wheel brake from the master cylinder such that brake pressure remains at a constant isolation level 68.

Subsequently, at time $t_3$, brake fluid is bled, or dumped, from the wheel brake to decrease brake fluid pressure 74. Thereafter, at time $t_5$, brake fluid pressure in the wheel brake may again be held constant 76. Such action is taken to prevent incipient wheel lock as the departure depth of the wheel velocity 60 continues to increase.

In the interim, at time $t_4$, the departure depth of the wheel velocity 60 has exceeded the premature activation level of the slip threshold 70. As a result, the control method 10 of the present invention determines that the previous activation of the anti-lock brake system was not premature and normal control of the anti-lock brake system continues. The slip threshold is also decreased to a high sensitivity level 72 to further improve anti-lock brake system performance.

Finally, at time $t_6$, the departure of the wheel velocity 60 from the vehicle velocity 58 is nearing recovery. Accordingly, brake fluid is reapplied to the wheel brake in order to increase brake fluid pressure therein 78. As previously stated, the rate of pressure buildup during re-application of brake fluid to the wheel brake may be steep, gradual, or some combination of both.

As with normal control, during premature activation recovery control of the anti-lock brake system shown in FIG. 3, while both vehicle velocity 58' and wheel velocity 60' increase between time $t_0$ and $t_1$, wheel brake pressure remains static 62'. At time $t_1$, the vehicle operator begins braking the vehicle. Both vehicle and wheel velocities 58', 60' begin to decrease in response to increasing brake fluid pressure as the wheel brake is applied 64'.

At time $t_2$, wheel velocity 60' has begun to decrease more rapidly than vehicle velocity 58', creating a departure depth. The departure depth having exceeded the normal operation level of the slip threshold 66', the anti-lock brake system is activated to isolate the wheel brake from the master cylinder such that wheel brake fluid pressure remains at a constant isolation level 68'.

Subsequently, at time $t_3$, brake fluid is bled, or dumped, from the wheel brake to decrease brake fluid pressure 74'. Thereafter, brake fluid pressure in the wheel brake may again be held constant 76'. Such action is taken to prevent incipient wheel lock as the departure depth of the wheel velocity 60' continues to increase.

However, after time $t_3$, the departure depth of the wheel velocity 60' begins to decrease, failing to exceed the premature activation level of the slip threshold 70'. As a result, the slip threshold is set at a premature activation recovery level 80. Typically, the premature activation recovery level of the slip threshold 80 is equal to that of the normal operation level of the slip threshold 66'.

At time $t_4$, the departure depth of the wheel velocity 60' has decreased such that it no-longer exceeds the premature activation level of the slip threshold 80. As a result, the control method 10 of the present invention determines that the previous activation of the anti-lock brake system was premature and normal control of the anti-lock brake system is bypassed.

Thus, at time $t_4$, the control method 10 of the present invention undertakes an aggressive brake fluid pressure buildup in the wheel brake at a premature activation recovery rate 82 to restore the brake fluid pressure to the wheel brake necessary for regular braking. The premature activation recovery rate of pressure buildup 82 is a selected rate greater than the typical rate of pressure buildup 78 during re-application of brake fluid to the wheel brake in normal control of the anti-lock brake system.

This aggressive brake fluid pressure buildup 82 in the wheel brake continues until such time as either a preselected period of time elapses or, due to the increasing pressure, the departure depth of the wheel velocity 60' exceeds the premature activation recovery level of the slip threshold 80. Thus, as seen in FIG. 3, at time $t_5$ the departure depth of the wheel velocity 60' has exceeded the premature activation recovery level of the slip threshold 80. As a result, the aggressive brake fluid pressure buildup 82 is terminated by dumping brake fluid from the wheel brake to decrease brake fluid pressure 84, and subsequently holding brake fluid pressure constant 86.

Thereafter, if the departure depth of the wheel velocity 60' continues to increase such that it exceeds the premature activation level of the slip threshold 70', normal control of the anti-lock brake system is restored. If, however, the departure depth of the wheel velocity 60' again fails to exceed the premature activation level of the slip threshold 70', the sequence described above is repeated.

Thus, as shown in FIG. 3, at time $t_6$ the departure depth of the wheel velocity 60' has exceeded the premature activation level of the slip threshold 70'. As a result, normal control of the anti-lock brake system is restored such that, at time $t_7$, when the departure of the wheel velocity 60' is nearing recovery, brake fluid is re-applied to the wheel brake to increase brake fluid pressure therein 78'.

In an alternative embodiment, either in addition to or instead of a slip depth parameter, the present invention may also determine whether the previous activation of the anti-lock brake system was premature based upon vehicle deceleration and/or slip duration thresholds. Preferably, in such an embodiment, even if the departure depth of the wheel velocity from the vehicle velocity exceeds the premature activation level of the slip threshold during an anti-lock braking event, the present invention may still determine that the previous activation of the anti-lock brake system was premature depending upon the level of the vehicle deceleration and/or the duration of the wheel slip.

Referring again to FIG. 3, between times $t_2$ and $t_4$, the wheel velocity 60' has exceeded the normal operation level of the slip threshold 66', 80 and recovered to that same normal operation level of the slip threshold 66', 80 without having exceeded the premature activation level of the slip threshold 70'. In both the previously described and alternative embodiments of the present invention, this condition indicates premature activation of the anti-lock braking system. In that event, no other vehicle parameters need be examined.

Between times $t_5$ and $t_7$, however, the wheel velocity 60' has exceeded the normal operation level of the slip threshold 80 and recovered to that same normal operation level of the slip threshold 80 having also exceeded the premature activation level of the slip threshold 70'. In the previously described embodiment of the present invention, this condition indicates that the prior activation of the anti-lock brake system was not premature. However, in the alternative embodiment, both the vehicle deceleration and the duration of the wheel slip may also be examined before any such determination is made.

More specifically, between times $t_5$ and $t_7$, the level of the vehicle deceleration and the duration of the wheel slip are also measured. In that regard, the level of the vehicle deceleration is represented by the slope of the plot of the vehicle velocity 58'. In that same regard, the duration of the wheel slip is represented by the time difference between $t_5$ and $t_7$, when the wheel velocity 60' recovers to and exceeds, respectively, the normal operation level of the slip threshold 80.

If, during that time period, the level of the vehicle deceleration exceeds a selected threshold, preferably 0.5 G, then the departure of the wheel velocity 60' from the vehicle velocity 58' is deemed to have been significant. The alternative embodiment of the present invention therefore determines that the prior activation of the anti-lock brake system was not premature and normal control of that system continues. If, however, the vehicle deceleration fails to exceed the selected threshold, the alternative embodiment of the present invention then examines wheel slip duration.

In that event, if the duration of the wheel slip exceeds a selected time threshold during that same time period, then the departure of the wheel velocity 60' from the vehicle velocity 58' is deemed to have been significant. The alternative embodiment of the present invention therefore determines that the prior activation of the anti-lock brake system was not premature and normal control of that system continues.

If, however, the duration of the wheel slip fails to exceed the selected time threshold during that same time period, then the departure of the wheel velocity 60' from the vehicle velocity 58' is not deemed to have been significant. The alternative embodiment of the present invention therefore determines that the prior activation of the anti-lock brake system was premature and normal control of that system is bypassed in favor of premature activation recovery control.

Thus, only if both the vehicle deceleration and the wheel slip duration fail to exceed their respective thresholds is the departure of the wheel velocity 60' from the vehicle velocity 58' deemed not to have been significant. In that event, the alternative embodiment of the present invention determines that the prior activation of the anti-lock brake system was premature and normal control of that system is bypassed in favor of premature activation recovery control.

As previously stated, this determination is made even though the departure depth of the wheel velocity 60' from the vehicle velocity 58' exceeded the premature activation level of the slip threshold 70'. Moreover, in this alternative embodiment of the present invention, premature activation of the anti-lock brake system must have been determined for both front wheels of the vehicle before normal control of the anti-lock brake system is by-passed and premature activation recovery control of that system is undertaken.

Figure 4:
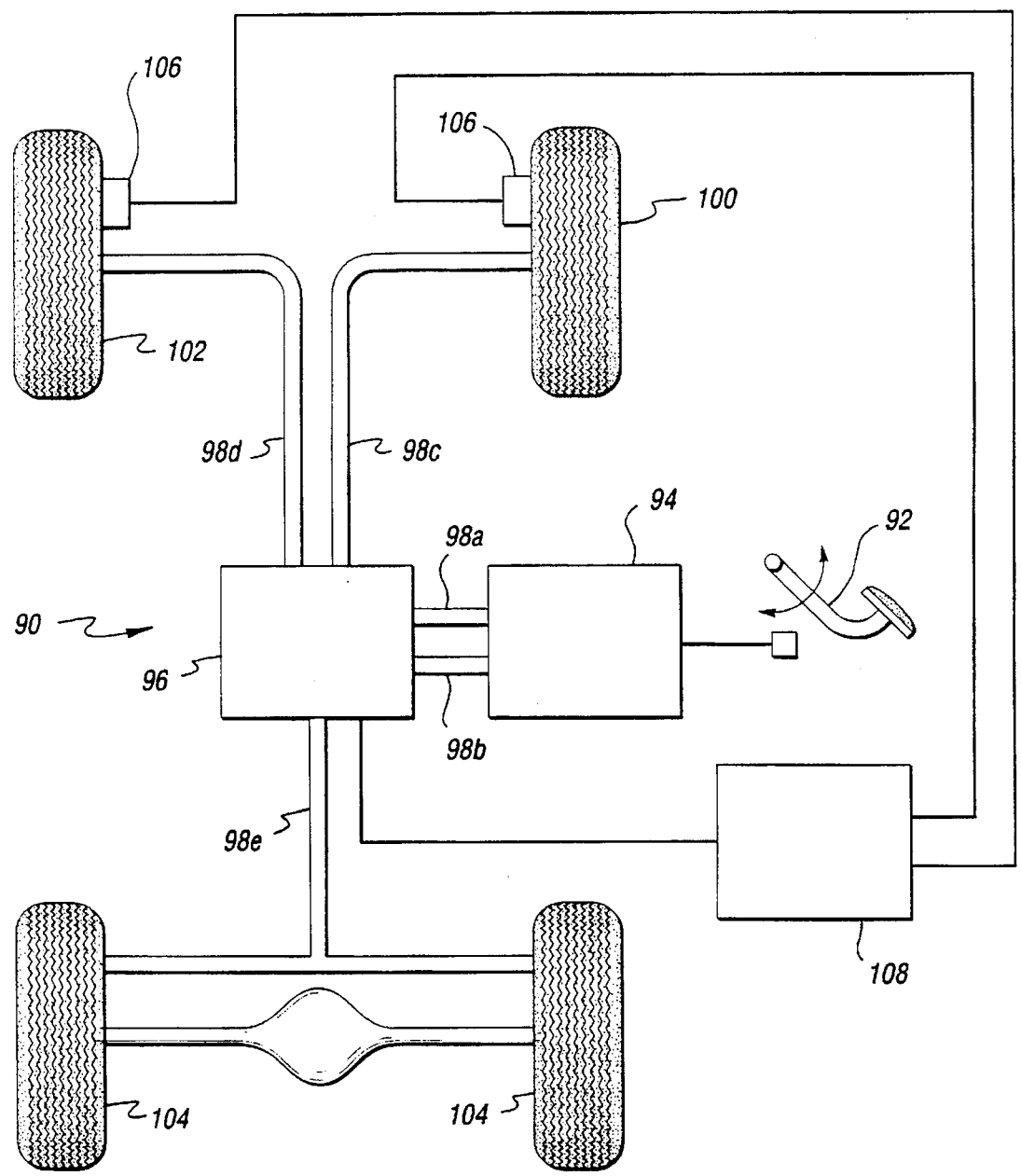
FIG. 4 is a schematic diagram of the control system of the present invention.

Referring finally to FIG. 4, a schematic diagram of the control system of the present invention is shown, denoted generally by reference numeral 90, in conjunction with an ordinary passenger vehicle anti-lock brake system. The anti-lock brake system includes a brake pedal 92, brake master cylinder 94, control valve 96, brake fluid conduit 98a, 98b, 98c, 98d and 98e, as well as right front wheel 100, left front wheel 102, and a pair of rear wheels 104.

The control system 90 of the present invention comprises a pair of vehicle wheel speed sensors 106 for measuring the velocity of each of the front wheels 100, 102. The control system 90 further comprises an anti-lock brake system control unit 108. Each of the wheel sensors 106 are operatively connected to the control unit 108, which is itself operatively connected to the anti-lock brake system control valve 96. Such operative connections are preferably electrical, but may also be other types of connections, such as fiber optic.

As is well known in the art, each of the wheel speed sensors 106 may comprise a stationary variable reluctance sensor (not shown) positioned adjacent a toothed wheel (not shown) which rotates with its respective vehicle wheel 100, 102. The variable reluctance sensors each generate a pulsed signal whose frequency varies directly with the speed of the respective vehicle wheels 100, 102. Other well known wheel speed sensor configurations may also be employed.

The control unit 108 takes the form of a commercially available microprocessor. Once programmed, the microprocessor control unit 108, together with the components described above, function as the means for carrying out the steps associated with the method 10 detailed above.

As previously stated, to engage premature activation recovery control of the anti-lock brake system, the control unit 108 is operatively connected to the anti-lock brake system control valve 96. It is the control valve 96 which provides for regulation of the brake fluid from the master cylinder 94 to the individual wheel brakes (not shown) of each of the wheels 100, 102 via the brake fluid conduits 98a, 98b, 98c, and 98d.

The control method 10 and system 90 of the present invention have been described and shown herein as applied to the two front wheels of an ordinary passenger vehicle anti-lock brake system. However, it should be readily apparent to one of ordinary skill in the art that the control method 10 and system 90 of the present invention are suitable for use in any vehicle wherein an anti-lock brake system may be required, and may be applied to any number of vehicle wheels.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

What is claimed is:

1. A control method for a vehicle anti-lock brake system, the method providing for recovery from premature activation of the vehicle anti-lock brake system, the method comprising:

generating an input signal representing a vehicle wheel velocity;

processing the input signal to determine a vehicle deceleration;

comparing the vehicle deceleration to a deceleration threshold;

generating a premature activation recovery control signal when the vehicle deceleration fails to exceed the deceleration threshold; and performing premature activation recovery control of the anti-lock brake system in response to the premature activation recovery control signal.

2. The method of claim 1 wherein performing premature activation recovery control comprises:

increasing brake fluid pressure to a vehicle wheel brake prematurely isolated from a master cylinder brake fluid pressure at a premature activation recovery rate;

setting a slip threshold at a premature activation recovery level; and determining a departure depth.

3. The method of claim 2 wherein performing premature activation recovery control further comprises:

comparing the departure depth to the premature activation recovery level of the slip threshold; and terminating the premature activation recovery rate of brake fluid pressure increase to the vehicle wheel brake when the departure depth exceeds the premature activation recovery level of the slip threshold.

4. The method of claim 3 wherein performing premature activation recovery control further comprises terminating the premature activation recovery rate of brake fluid pressure increase to the vehicle wheel brake after a preselected period of time.

5. A control method for a vehicle anti-lock brake system, the method providing for recovery from premature activation of the vehicle anti-lock brake system, the method comprising:

generating an input signal representing a vehicle wheel velocity;

processing the input signal to determine a wheel slip duration;

comparing the wheel slip duration to a slip duration threshold;

generating a premature activation recovery control signal when the wheel slip duration fails to exceed the slip duration threshold; and performing premature activation recovery control of the anti-lock brake system in response to the premature activation recovery control signal.

6. The method of claim 5 wherein processing the input signal to determine a wheel slip duration comprises:

determining a departure depth;

setting a slip threshold at a normal activation level; and determining a time interval between when the departure depth exceeds the slip threshold and when the departure depth fails to exceed the slip threshold.

7. The method of claim 5 wherein performing premature activation recovery control comprises:

increasing brake fluid pressure to a vehicle wheel brake prematurely isolated from a master cylinder brake fluid pressure at a premature activation recovery rate;

setting a slip threshold at a premature activation recovery level; and determining a departure depth.

8. The method of claim 7 wherein performing premature activation recovery control further comprises:

comparing the departure depth to the premature activation recovery level of the slip threshold; and terminating the premature activation recovery rate of brake fluid pressure increase to the vehicle wheel brake when the departure depth exceeds the premature activation recovery level of the slip threshold.

9. The method of claim 8 wherein performing premature activation recovery control further comprises terminating the premature activation recovery rate of brake fluid pressure increase to the vehicle wheel brake after a preselected period of time.

10. A control method for a vehicle anti-lock brake system, the method providing for recovery from premature activation of the vehicle anti-lock brake system, the method comprising:

generating an input signal representing a vehicle wheel velocity;

processing the input signal to determine a vehicle deceleration and a wheel slip duration;

comparing the vehicle deceleration to a deceleration threshold;

comparing the wheel slip duration to a slip duration threshold;

generating a premature activation recovery control signal when both the vehicle deceleration and the wheel slip duration fail to exceed their respective deceleration and slip duration thresholds; and performing premature activation recovery control of the anti-lock brake system in response to the premature activation recovery control signal.

11. A control system for a vehicle anti-lock brake system, the system providing for recovery from premature activation of the vehicle anti-lock brake system, the system comprising:

means for generating an input signal representing a vehicle wheel velocity;

means for processing the input signal to determine a vehicle deceleration;

means for comparing the vehicle deceleration to a deceleration threshold;

means for generating a premature activation recovery control signal when the vehicle deceleration fails to exceed the deceleration threshold; and means for performing premature activation recovery control of the anti-lock brake system in response to the premature activation recovery control signal.

12. The system of claim 11 wherein the means for performing premature activation recovery control comprises:

means for increasing brake fluid pressure to a vehicle wheel brake prematurely isolated from a master cylinder brake fluid pressure at a premature activation recovery rate;

means for setting a slip threshold at a premature activation recovery level; and means for determining a departure depth.

13. The system of claim 12 wherein the means for performing premature activation recovery control further comprises:

means for comparing the departure depth to the premature activation recovery level of the slip threshold; and means for terminating the premature activation recovery rate of brake fluid pressure increase to the vehicle wheel brake when the departure depth exceeds the premature activation recovery level of the slip threshold.

14. The system of claim 13 wherein the means for performing premature activation recovery control further comprises means for terminating the premature activation recovery rate of brake fluid pressure increase to the vehicle wheel brake after a preselected period of time.

15. A control system for a vehicle anti-lock brake system, the system providing for recovery from premature activation of the vehicle anti-lock brake system, the system comprising:

means for generating an input signal representing a vehicle wheel velocity;

means for processing the input signal to determine a wheel slip duration;

means for comparing the wheel slip duration to a slip duration threshold;

means for generating a premature activation recovery control signal when the wheel slip duration fails to exceed the slip duration threshold; and means for performing premature activation recovery control of the anti-lock brake system in response to the premature activation recovery control signal.

16. The system of claim 15 wherein the means for processing the input signal to determine a wheel slip duration comprises:

means for determining a departure depth;

means for setting a slip threshold at a normal activation level; and means for determining a time interval between when the departure depth exceeds the slip threshold and when the departure depth fails to exceed the slip threshold.

17. The system of claim 15 wherein the means for performing premature activation recovery control comprises:

means for increasing brake fluid pressure to a vehicle wheel brake prematurely isolated from a master cylinder brake fluid pressure at a premature activation recovery rate;

means for setting a slip threshold at a premature activation recovery level; and means for determining a departure depth.

18. The system of claim 17 wherein the means for performing premature activation recovery control further comprises:

means for comparing the departure depth to the premature activation recovery level of the slip threshold; and means for terminating the premature activation recovery rate of brake fluid pressure increase to the vehicle wheel brake when the departure depth exceeds the premature activation recovery level of the slip threshold.

19. The system of claim 18 wherein the means for performing premature activation recovery control further comprises means for terminating the premature activation recovery rate of brake fluid pressure increase to the vehicle wheel brake after a preselected period of time.

20. A control system for a vehicle anti-lock brake system, the system providing for recovery from premature activation of the vehicle anti-lock brake system, the system comprising:

means for generating an input signal representing a vehicle wheel velocity;

means for processing the input signal to determine a vehicle deceleration and a wheel slip duration;

means for comparing the vehicle deceleration to a deceleration threshold;

means for comparing the wheel slip duration to a slip duration threshold;

means for generating a premature activation recovery control signal when both the vehicle deceleration and the wheel slip duration fail to exceed their respective deceleration and slip duration thresholds; and means for performing premature activation recovery control of the anti-lock brake system in response to the premature activation recovery control signal.

21. A control method for a vehicle anti-lock brake system, the method providing for recovery from premature activation of the anti-lock brake system, the method comprising:

determining a vehicle wheel velocity;

comparing the vehicle wheel velocity to a normal operation slip threshold;

isolating a vehicle wheel brake from a master cylinder brake fluid pressure when the vehicle wheel velocity transitions from greater than to less than the normal operation slip threshold;

measuring a time interval beginning at the activation of the anti-lock brake system and ending when the vehicle wheel velocity first transitions from less than to greater than the normal operation slip threshold;

comparing the time interval to a wheel slip duration threshold;

determining a vehicle deceleration during the time interval;

comparing the vehicle deceleration to a vehicle deceleration threshold;

increasing brake fluid pressure to the vehicle wheel brake at a premature activation recovery rate if both the vehicle deceleration and the time interval fail to exceed their respective thresholds; and terminating the premature activation recovery rate of brake fluid pressure increase to the vehicle wheel brake when the vehicle wheel velocity transitions from greater than to less than a premature activation slip threshold.

22. The method of claim 21 further comprising terminating the premature activation recovery rate of brake fluid pressure increase to the vehicle wheel brake after a preselected period of time.

23. The method of claim 21 wherein the normal operation slip threshold and the premature activation slip threshold are equal.

24. A control system for a vehicle anti-lock brake system, the system providing for recovery from premature activation of the anti-lock brake system, the system comprising:

means for determining a vehicle wheel velocity;

means for comparing the vehicle wheel velocity to a normal operation slip threshold;

means for isolating a vehicle wheel brake from a master cylinder brake fluid pressure when the vehicle wheel velocity transitions from greater than to less than the normal operation slip threshold;

means for measuring a time interval beginning at the activation of the anti-lock brake system and ending when the vehicle wheel velocity first transitions from less than to greater than the normal operation slip threshold;

means for comparing the time interval to a wheel slip duration threshold;

means for determining a vehicle deceleration during the time interval;

means for comparing the vehicle deceleration to a vehicle deceleration threshold;

means for increasing brake fluid pressure to the vehicle wheel brake at a premature activation recovery rate if both the vehicle deceleration and the time interval fail to exceed their respective thresholds; and means for terminating the premature activation recovery rate of brake fluid pressure increase to the vehicle wheel brake when the vehicle wheel velocity transitions from greater than to less than a premature activation slip threshold.

25. The system of claim 24 further comprising means for terminating the premature activation recovery rate of brake fluid pressure increase to the vehicle wheel brake after a preselected period of time.

26. The system of claim 24 wherein the normal operation slip threshold and the premature activation slip threshold are equal.

* * * * *